United States Patent
Gerhardt et al.

(10) Patent No.: US 8,740,105 B2
(45) Date of Patent: Jun. 3, 2014

(54) CONTROL DEVICE FOR AN ENGINE-INDEPENDENT HEATER, HEATING SYSTEM, AND METHOD FOR CONTROLLING AN ENGINE-INDEPENDENT HEATER

(75) Inventors: Nikolaus Gerhardt, Oberschleissheim (DE); Karl Göttl, Rosenheim (DE); Markus Griner, Germering (DE)

(73) Assignee: Webasto AG, Stockdorf (DE)

( * ) Notice: Subject to any disclaimer, the term of this patent is extended or adjusted under 35 U.S.C. 154(b) by 914 days.

(21) Appl. No.: 12/090,623

(22) PCT Filed: Oct. 23, 2006

(86) PCT No.: PCT/DE2006/001880
§ 371 (c)(1),
(2), (4) Date: Aug. 12, 2008

(87) PCT Pub. No.: WO2007/048394
PCT Pub. Date: May 3, 2007

(65) Prior Publication Data
US 2009/0008464 A1    Jan. 8, 2009

(30) Foreign Application Priority Data
Oct. 24, 2005   (DE) .......................... 10 2005 050 862

(51) Int. Cl.
*B60H 1/22*     (2006.01)
*G05D 23/02*   (2006.01)

(52) U.S. Cl.
USPC ................. 237/34; 237/5; 236/99 R; 700/276

(58) Field of Classification Search
CPC ............... B60H 2001/224; B60H 2001/00992; B60H 1/2206; B60H 1/32; B60H 1/00807; B60H 1/00735; F24F 11/0086; F24F 11/006

USPC ........................ 237/5, 34; 236/99 R; 700/276
See application file for complete search history.

(56) References Cited

U.S. PATENT DOCUMENTS

| 4,123,678 A | 10/1978 | Jacoby |
| 4,436,064 A * | 3/1984 | Lamkewitz et al. ... 123/142.5 R |

(Continued)

FOREIGN PATENT DOCUMENTS

| DE | 35 17953 | 11/1986 |
| DE | 41 23 678 | 1/1993 |

(Continued)

OTHER PUBLICATIONS

Ganz, et al., DE 4123678 A1, Jan. 21, 1993, machine translation.*

(Continued)

*Primary Examiner* — Kang Hu
*Assistant Examiner* — Phillip E Decker
(74) *Attorney, Agent, or Firm* — Fitch, Even, Tabin & Flannery LLP

(57) ABSTRACT

The invention relates to a control device (12) for an engine-independent heater (3) that heats a liquid heat transfer medium of a heat transfer medium circuit (1) especially for motor vehicles. Said control device (12) reduces a heater (3) capacity when an actual temperature gradient $((dT/dt)_{Ist})$ of the heat transfer medium is equal to or exceeds a temperature gradient threshold value $((dT/dt)_{Schwell})$. The control device (12) determines the temperature gradient threshold value $((dT/dt)_{Schwell})$ dynamically in accordance with a difference in temperature $(\Delta\phi)$ between a target temperature $(\phi_{Soll})$ of the heat transfer medium and an actual temperature $(\phi_{Ist})$ of the heat transfer medium. The invention further relates to a heater (3), a heating system (1), and a method for controlling the inventive heater (3).

10 Claims, 2 Drawing Sheets

(56) References Cited

U.S. PATENT DOCUMENTS

| | | | |
|---|---|---|---|
| 4,685,616 A * | 8/1987 | Stein | 237/12 |
| 4,852,797 A * | 8/1989 | Goerlich | 237/2 A |
| 5,788,148 A * | 8/1998 | Burner et al. | 237/2 A |
| 6,006,997 A | 12/1999 | Pfister et al. | |
| 6,793,147 B2 * | 9/2004 | Elm et al. | 237/12.3 C |
| 6,888,110 B2 * | 5/2005 | Baier et al. | 219/494 |
| 6,955,303 B2 * | 10/2005 | Elm et al. | 237/12.3 C |
| 7,025,026 B2 * | 4/2006 | Young et al. | 123/142.5 R |
| 7,055,760 B2 * | 6/2006 | Paul et al. | 237/12.3 C |
| 7,270,098 B2 * | 9/2007 | Young et al. | 123/142.5 R |
| 7,947,930 B2 * | 5/2011 | Reiter et al. | 219/493 |
| 2001/0035825 A1 * | 11/2001 | Messmer | 340/584 |
| 2004/0168450 A1 * | 9/2004 | Nishiwaki | 62/178 |
| 2006/0025820 A1 * | 2/2006 | Phillips et al. | 607/2 |
| 2007/0040042 A1 * | 2/2007 | Stapensea | 237/19 |
| 2007/0246554 A1 * | 10/2007 | Watanabe et al. | 237/2 A |
| 2009/0008464 A1 | 1/2009 | Gerhardt et al. | |
| 2009/0074675 A1 | 3/2009 | Eldred et al. | |

FOREIGN PATENT DOCUMENTS

| | | |
|---|---|---|
| DE | 195 24 260 | 1/1997 |
| DE | 102005050862.6 B3 | 5/2007 |
| EP | 1 275 537 | 1/2003 |
| JP | 60-101575 A | 6/1985 |
| JP | 60101575 A | 6/1985 |
| JP | 01-204814 A | 8/1989 |
| JP | 8-276727 A | 10/1996 |
| JP | 01-204814 A | 7/2001 |
| JP | 2001204814 A | 7/2001 |
| JP | 200232889 A | 8/2004 |
| JP | 200432889 A | 8/2004 |
| JP | 2004232889 A | 8/2004 |
| JP | 2006-061359 A * | 3/2006 |

OTHER PUBLICATIONS

Lindeburg, Mechanical Engineering Reference Manual, 1990, Professional Publications, Eighth Edition, p. 1-13.*

Lindeburg, Mechanical Engineering Reference Manual, Eighth Edition, Professional Publications, 1990, p. 1-13.*

International Search Report dated Mar. 14, 2007.

* cited by examiner

CONTROL DEVICE FOR AN ENGINE-INDEPENDENT HEATER, HEATING SYSTEM, AND METHOD FOR CONTROLLING AN ENGINE-INDEPENDENT HEATER

This application is a 35 U.S.C. §371 National Stage entry of PCT/DE2006/001880, filed Oct. 23, 2006, which claims priority from German Patent Application No.: DE 10 2005 050 862.6, filed Oct. 24, 2005, the contents of which are herein incorporated by reference.

BACKGROUND OF THE INVENTION

The invention relates to a control device for an engine-independent heater that heats a liquid heat transfer medium of a heat transfer medium circuit especially for motor vehicles, the control device reducing a heating capacity of the heater when a current temperature gradient of the heat transfer medium is equal to or greater than a temperature gradient threshold value.

The invention further relates to a heater and a heating system.

Moreover, the invention relates to a method for controlling an engine-independent heater that heats a liquid heat transfer medium of a heat transfer medium circuit especially for motor vehicles.

There are already known in the prior art measures for the early detection of an overheating risk for a heater that is integrated in a heat transfer medium circuit. The aim in this case is to detect the threatening overheated state clearly before the occurrence of the actual overheated state such that it is possible to adopt countermeasures before damage occurs to the heater or the heat transfer medium circuit.

DE 195 24 260 C2 discloses a control device for an engine-independent heater, a heater, a heating system and a method for controlling an engine-independent heater. The heater described in DE 195 24 260 C2 is used especially for heating the interior of a motor vehicle. During operation, in the case of this heater the heating capacity is reduced or the heater is switched off when a current temperature gradient of the heat transfer medium overshoots a threshold value of the temperature gradient. Various threshold values of the temperature gradient are selected as a function of the current temperature of the heat transfer medium. Thus, a comparatively fast temperature rise can be permitted without a risk of overheating as long as the temperature level remains low and thus clearly below a dangerous temperature level. By contrast, as soon as high temperatures have already been reached only a comparatively slow temperature rise is still permissible.

Since, consequently, the threshold values of the temperature gradient are assigned fixed temperature values of the heat transfer medium, this assignment must be stipulated in advance as a function of the properties, such as thermodynamic properties, for example, of the heat transfer system. After a change of the heat transfer system, for example after the use of another heat transfer medium, the control of the heater can now only be used conditionally and is no longer adapted to the changed system.

SUMMARY OF THE INVENTION

It is therefore the object of the present invention to develop the generic components and the generic method in such a way as to render possible a flexible control of the heater that detects a possible case of overheating even earlier and in a more differentiated fashion.

This object is achieved by means of the features of the independent claims.

Advantageous refinements and developments of the invention follow from the dependent claims.

The inventive control device for an engine-independent heater builds on the generic prior art by virtue of the fact that the control device determines the temperature gradient threshold value dynamically as a function of a temperature difference between a target temperature of the heat transfer medium that is to be achieved and a current heat transfer medium temperature. Because the temperature gradient threshold value is determined dynamically, that is to say in a fashion repeated again and again, the exact temperature gradient threshold value upon whose overshooting an overheated state of the heat transfer system or a component thereof could occur is permanently present. Since, moreover, the temperature gradient threshold value is determined as a function of the temperature difference between actual and desired temperature, the control device is also suitable for controlling a heater in the case of which the target temperature of the heat transfer medium varies. This target temperature of the heat transfer medium can, for example, depend on the heat transfer medium used so that a lower maximum target temperature is generally permissible when use is made of a heat transfer medium in the case of which the overheated state occurs at a comparatively lower temperature. Moreover, it would be conceivable to aim to operate the heat transfer medium at various temperature levels during various operating phases. The detection of a threatening overheated state can be performed in a reliable way on the basis of the invention at various target temperatures. It follows that a possible overheated state of the heat transfer system or of a component thereof can be detected in a much more differentiated fashion and earlier by means of the inventive control device.

The inventive control device can be developed advantageously by virtue of the fact that when determining the temperature gradient threshold value the control device additionally takes account of an ambient temperature. Consequently, during the detection of a threatening overheated state account is also taken of which environment the inventive heater or the inventive heating system is being used in, including with regard to the use of a motor vehicle in various climatic regions. If, for example, the ambient temperature is relatively low, a high temperature gradient is less indicative of an instance of overheating than in the case of an environment with relatively high temperature. The inventive control device in accordance with this development takes account of this circumstance.

In a preferred embodiment of the inventive control device, it is provided, furthermore, that the control device determines the temperature gradient threshold value by calculating it. The optimum determination of the temperature gradient threshold value is achieved owing to the dynamic, that is to say constantly repeated, calculation of the temperature gradient threshold value. Alternatively, the control device can determine the temperature gradient threshold value by reading it from a table. Here, the accuracy of the determination of an overheated state depends on the intervals used to store the temperature gradient threshold value in the table. The calculation has the advantage that there is no need to provide any memory consuming tables in advance, it being the case, however, that the temperature gradient threshold value is determined close to the time when the inventive control device is being operated.

Furthermore, the inventive control device can be developed in such a way that the control device determines the temperature gradient threshold value with the aid of the equation $$\left(\frac{dT}{dt}\right)_{Schwell} = c_1\left(\frac{\Delta v}{\Delta t}\right)^2 + c_2\frac{\Delta v}{\Delta t} + c_3$$

in which $c_1$, $c_2$ and $c_3$ are coefficients determined in advance and stored in the control device. The ambient temperature is not necessarily involved here in the determination of the temperature gradient threshold value. It is, for example, conceivable for the coefficients to be determined in advance by trials and stored in the control device. Moreover, calculations can be the basis for the coefficients determined in advance, depending on selected heat transfer system components, the selected heat transfer medium, and the like.

Furthermore, the inventive control device can be developed in such a way that the control device determines the temperature gradient threshold value with the aid of the equation $$\left(\frac{dT}{dt}\right)_{Schwell} = c_1\left(\frac{\Delta v}{\Delta t}\right)^2 + c_2\frac{\Delta v}{\Delta t} + c_3,$$

in which $c_1$, $c_2$ and $c_3$ are coefficients determined in advance and stored in the control device. The ambient temperature is not necessarily involved here in the determination of the temperature gradient threshold value. It is, for example, conceivable for the coefficients to be determined in advance by trials and stored in the control device. Moreover, calculations can be the basis for the coefficients determined in advance, depending on selected heat transfer system components, the selected heat transfer medium, and the like.

Alternatively, the inventive control device can be developed such that the control device determines the temperature gradient threshold value with the aid of the equation $$\left(\frac{dT}{dt}\right)_{Schwell} = c_1\left(\frac{\Delta \vartheta}{\Delta t}\right)^2 + c_2\frac{\Delta \vartheta}{\Delta t} + c_3,$$

in which $c_1$ and $c_2$ are coefficients determined by the control device as a function of the ambient temperature, and $c_3$ is a coefficient determined in advance and stored in the control device.

These formulas provide a particular way of determining the temperature gradient threshold value.

The inventive heater, heating system and method for controlling the heater are based on the generic prior art by virtue of the fact that the control device determines the temperature gradient threshold value dynamically as a function of a temperature difference between a target temperature of the heat transfer medium that is to be achieved and a current heat transfer medium temperature. Advantages and properties explained in conjunction with the inventive control device thereby result in the same or a similar way.

BRIEF DESCRIPTION OF THE DRAWINGS

A preferred embodiment of the invention is explained below by way of example with the aid of the figures, in which.

DETAILED DESCRIPTION OF THE INVENTION

Figure 1:
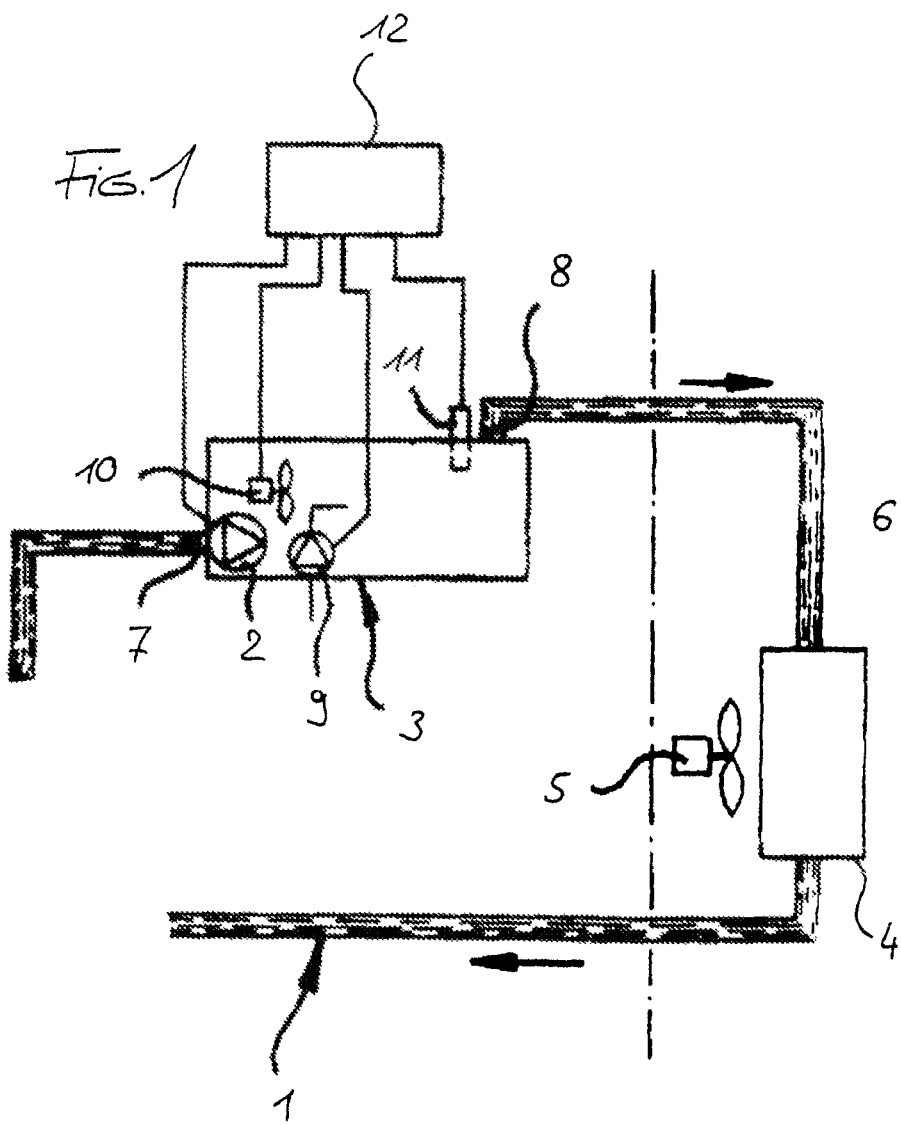
FIG. 1 shows a schematic block diagram of the inventive heating system.

FIG. 1 illustrates schematically an example of the heat transfer system or heat transfer medium circuit 1 such as, for example, a coolant circuit with a heater for motor vehicles. As indicated by arrows, a heat transfer medium such as, for example, water, that can contain additives circulates in the heat transfer medium circuit 1. The heat transfer medium circuit 1 includes a recirculating pump 2, an engine-independent, fuel operated heater 3, in which the recirculating pump 2 is integrated, and a heat exchanger 4 to which a vehicle heating fan 5 is assigned. With the heat transfer medium heated up and the fan 5 switched on, heat is output to a vehicle interior 6 that is indicated in FIG. 1 schematically by the part lying to the right of the dashed and dotted line.

The heater 3 has an inlet 7 and an outlet 8. The inlet 7 and the outlet side of the heat exchanger 4 can lead, for example, to an internal combustion engine (not illustrated). Furthermore, the heater 3 comprises a dosing pump 9 and a combustion air fan 10 for feeding combustion air and fuel to a burner assembly (otherwise not shown in more detail). Furthermore, the recirculating pump 2, which causes the heat transfer medium to circulate in the heat transfer medium circuit 1, is integrated in the heater 3. Denoted by 11 in FIG. 1 is a temperature sensor that is arranged in the region of the outlet 8 of the heater 3, expediently in a fashion integrated therein, and detects the temperature ($t_{Ist}$) of the heat transfer medium at the outlet from the heater 3.

The output of the temperature sensor 11 is connected to a control device 12 whose outputs are connected to the recirculating pump 2, the dosing pump 9 and the combustion air fan 10. It is essential to the invention that the control device 12 can influence the heater 3 in such a way that it can control the heating capacity thereof. This can be implemented by appropriately driving the dosing pump 9 and/or the combustion air fan 10. For example, the control device 12 could also be connected to an operational control (not illustrated) inside the heater, the control device 12 passing on only a targeted heating capacity to the operational control, and the operational control dedicated to the heater driving the dosing pump 9 and the combustion air fan 10 as appropriate such that this target heating capacity is reached. The control device 12 can also itself be integrated in the heater 3.

After the heater 3 has been started, heat transfer medium temperatures ($\theta_{Ist}$) are output in specific time intervals via the temperature sensor 11 to the control device 12, and are evaluated by the latter. The control device 12 in this case evaluates the temperature rise of the heat transfer medium per time unit so as to produce the temporal temperature gradient (($dT/dt)_{Ist}$) of the heat transfer medium. In this case, the checking and calculation of the temperature gradient (($dT/dt)_{Ist}$) are performed in a time interval to be defined. To this end, the control device requires at least two heat transfer medium temperatures ($\theta_{Ist}$) measured in a predetermined time interval for the purpose of calculating the current temperature gradient (($dT/dt)_{Ist}$).

This determined current temperature gradient (($dT/dt)_{Ist}$) of the heat transfer medium is compared in ever recurrent repetitions with a temperature gradient threshold value (($dT/dt)_{Schwell}$). As soon as the current temperature gradient (($dT/dt)_{Ist}$) reaches or overshoots the temperature gradient threshold value (($dT/dt)_{Schwell}$), this is an early indication of the risk of occurrence of an overheated state, and the heating capacity of the heater 3 is reduced or the heater 3 is switched off.

Such an overheated state can be caused by a dry overheating, that is to say a lack of coolant in the heat transfer medium of the heater 3, or by a stationary heat transfer medium in the heat transfer medium circuit 1. It is essential in the case of this detection of a possible impending overheated state that the control device 12 detect and differentiate a possible overheating extremely early. Thus, it is important that the heater 3 reduce the heating capacity early in order not to arrive in a safety critical temperature range. In the scope of the present disclosure, the term "reducing the heating capacity" also covers switching off the heater 3 completely, in which case the heating capacity is reduced to zero.

The temperature gradient threshold value $((dT/dt)_{Schwell})$ is recalculated dynamically, that is to say in ever recurrent repetitions, for the purpose of the above-described comparison of the current temperature gradient $((dT/dt)_{Ist})$ of the heat transfer medium with a temperature gradient threshold value $((dT/dt)_{Schwell})$.

To this end, the temperature difference ($\Delta\theta$) between the target temperature ($\theta_{Soll}$) of the heat transfer medium that is to be reached and the current temperature ($\theta_{Ist}$) of the heat transfer medium is firstly calculated using the following equation:

$$\Delta\theta = \theta_{Soll} - \theta_{Ist}.$$

Consequently, the temperature gradient threshold value $((dT/dt)_{Schwell})$ is calculated as a function of this calculated temperature difference ($\Delta v$) and as a function of the ambient temperature ($T_{amb}$) using the following equation:

$$\left(\frac{dT}{dt}\right)_{Schwell} = c_1\left(\frac{\Delta v \vartheta}{\Delta t}\right)^2 + c_2\frac{\Delta \vartheta}{\Delta t} + c_3.$$

Here, $c_1$ and $c_2$ are coefficients to be determined as a function of the ambient temperature ($T_{amb}$). To this end, the ambient temperature ($T_{amb}$) is detected by an ambient temperature sensor (not illustrated), and output to the control unit that thereupon recalculates the coefficients $c_1$ and $c_2$ at specified intervals. $\Delta t$ constitutes an arbitrary time interval that ideally possesses the physical unit of the detected temperature gradient and has the value 1.

$c_3$ is a coefficient that is to be determined and is not a function of the ambient temperature ($T_{amb}$). For example, the coefficient $c_3$ can be determined in advance with the aid of trials or simulations.

Alternatively, a calculation independent of the ambient temperature ($T_{amb}$) is also conceivable. In this case, however, the coefficients $c_1$ and $c_2$ would not necessarily vanish. In such a case, the coefficients $c_1$ and $c_2$ can likewise be determined with the aid of trials or simulations, for example.

Figure 2:
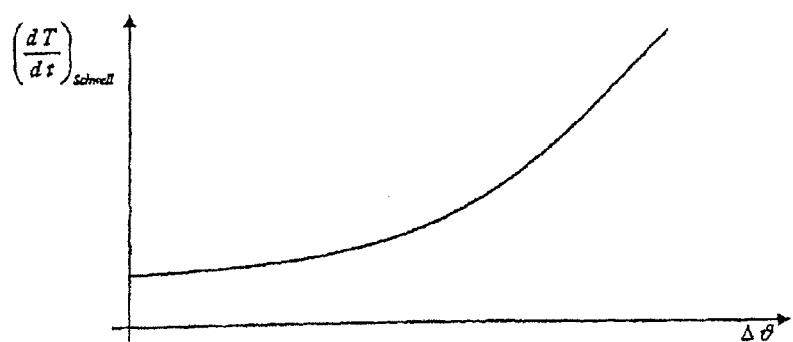
FIG. 2 shows a diagram providing a qualitative explanation of the functional relationship between temperature gradient threshold value and the temperature difference between the target temperature of the heat transfer medium to be achieved and a current heat transfer medium temperature.

The calculation of the temperature gradient threshold value $((dT/dt)_{Schwell})$ with the aid of the above equation is illustrated qualitatively in FIG. 2. Here, the abscissa shows the temperature difference ($\Delta\theta$), and the ordinate the temperature gradient threshold value $((dT/dt)_{Schwell})$.

It is to be seen with the aid of FIG. 2 that the maximum permitted temperature gradient $((dT/dt)_{Ist})$, that is to say the temperature gradient threshold value $((dT/dt)_{Schwell})$, rises with increasing temperature difference (for example, in the starting phase of the heater). The advantages described at the beginning can thereby be achieved.

A fuel operated heater 3 was used in the explanation of the preferred embodiment. However, the invention is not restricted thereto but can, however, also be used in the case of electrically operated heaters.

Furthermore, the temperature sensor 11 need not necessarily measure the temperature of the heat transfer medium directly. For example, the burner assembly could be surrounded by a closed, liquid heat exchange medium via which the heat transfer medium is heated. In such a case, it would also be conceivable to measure the temperature of the heat exchange medium.

In the preceding description and the attached claims, it is intended that the term "control" also cover a "regulation". Thus, for example, the description of the driving of the heater 3 is also intended to cover this driving being performed in the course of a regulation.

The features of the invention that are disclosed in the above description and the drawings as well as in the claims can be essential to the implementation of the invention both individually and in any desired combination.

The invention claimed is:

1. A control device for an engine-independent heater that heats a liquid heat transfer medium of a heat transfer medium circuit especially for motor vehicles, the control device reducing a heating capacity of the heater when a current temperature gradient $((dT/dt)_{Ist})$ of the heat transfer medium is equal to or greater than a temperature gradient threshold value $((dT/dt)_{Schwell})$, wherein the control device repeatedly recalculates the current temperature gradient $((dT/dt)_{Ist})$ from heat transfer medium temperatures ($\theta_{Ist}$) measured at different times, wherein the control device repeatedly recalculates the temperature gradient threshold value $((dT/dt)_{Schwell})$ dynamically as a function of a temperature difference ($\Delta\theta = \theta_{soll} - \theta_{Ist}$) between a target temperature ($\theta_{soll}$) of the heat transfer medium that is to be achieved where the heat transfer medium temperature is measured and the current heat transfer medium temperature ($\theta_{Ist}$), and wherein the temperature gradient threshold value $((dT/dt)_{Schwell})$ rises with increasing temperature difference $\Delta\theta = \theta_{soll} - \theta_{Ist}$.

2. The control device of claim 1, wherein when repeatedly recalculating the temperature gradient threshold value $((dT/dt)_{Schwell})$ the control device additionally takes account of an ambient temperature ($T_{amb}$).

3. The control device of claim 1, wherein the control device repeatedly recalculates the temperature gradient threshold value $((dT/dt)_{Schwell})$ with the aid of the equation $$\left(\frac{dT}{dt}\right)_{Schwell} = c_1\left(\frac{\Delta v}{\Delta t}\right)^2 + c_2\frac{\Delta v}{\Delta t} + c_3$$

in which $c_1$, $c_2$ and $c_3$ are coefficients determined in advance and stored in the control device.

4. The control device of claim 1, wherein the control device repeatedly recalculates the temperature gradient threshold value $((dT/dt)_{Schwell})$ with the aid of the equation $$\left(\frac{dT}{dt}\right)_{Schwell} = c_1\left(\frac{\Delta v}{\Delta t}\right)^2 + c_2\frac{\Delta v}{\Delta t} + c_3$$

in which $c_1$ and $c_2$ are coefficients determined by the control device as a function of the ambient temperature ($T_{amb}$), and $c_3$ is a coefficient determined in advance and stored in the control device.

5. A heater, especially for motor vehicles, having:
   an engine-independent heat source for heating a liquid heat transfer medium located in a heat transfer medium circuit, a temperature sensor for detecting a current temperature of the heat transfer medium in the surroundings of an outlet at which the heat transfer medium exits the heater, and a control device for controlling a heating capacity of the heater by reducing a heating capacity of the heater when a current temperature gradient $((dT/dt)_{Ist})$ of the heat transfer medium is equal to or greater than a temperature gradient threshold value $((dT/dt)_{schwell})$, wherein the control device repeatedly recalculates the temperature gradient threshold value $((dT/dt)_{schwell})$ dynamically as a function of a temperature difference $(\Delta\theta=\theta_{soll}\ \theta_{Ist})$ between a target temperature $(\theta_{soll})$ of the heat transfer medium that is to be achieved and a current heat transfer medium temperature $(\theta_{Ist})$, wherein the temperature gradient threshold value $((dT/dt)_{schwell})$ rises with increasing temperature difference $\Delta\theta=\theta_{soll}-\theta_{Ist}$.

6. A heating system especially for motor vehicles, having:
a heat transfer medium circuit that is filled with a liquid heat transfer medium that is capable of absorbing thermal energy, transporting it further, and outputting it again at a predetermined location, and
a heater, having
an engine-independent heat source for heating a liquid heat transfer medium located in a heat transfer medium circuit,
a temperature sensor for detecting a current temperature of the heat transfer medium in the surroundings of an outlet at which the heat transfer medium exits the heater, and
a control device for controlling a heating capacity of the heater by reducing a heating capacity of the heater when a current temperature gradient $((dT/dt)_{Ist})$ of the heat transfer medium is equal to or greater than a temperature gradient threshold value $((dT/dt)_{schwell})$, wherein the control device repeatedly recalculates the temperature gradient threshold value $((dT/dt)_{schwell})$ dynamically as a function of a temperature difference $(\Delta\theta=\theta_{soll}-\theta_{Ist})$ between a target temperature $(\theta_{soll})$ of the heat transfer medium that is to be achieved and a current heat transfer medium temperature $(\theta_{soll})$, wherein the temperature gradient threshold value $((dT/dt)_{schwell})$ rises with increasing temperature difference $\Delta\theta=\theta_{soll}-\theta_{Ist}$.

7. A method for controlling an engine-independent heater that heats a liquid heat transfer medium of a heat transfer medium circuit especially for motor vehicles, the method having a control device that performs the following steps:

determining a current temperature gradient $((dT/dt)_{Ist})$ of the heat transfer medium, determining a temperature gradient threshold value $((dT/dt)_{schwell})$, wherein the current temperature gradient $((dT/dt)_{Ist})$ is repeatedly recalculated from heat transfer medium temperatures $(\theta_{Ist})$ measured at different times, comparing the current temperature gradient $((dT/dt)_{Ist})$ with the temperature gradient threshold value $((dT/dt)_{schwell})$, and reducing a heating capacity of the heater when the current temperature gradient $((dT/dt)_{Ist})$ is equal to or greater than the temperature gradient threshold value $((dT/dt)_{schwell})$, and wherein the temperature gradient threshold value $((dT/dt)_{schwell}$ is repeatedly recalculated dynamically and as a function of a temperature difference $(\Delta\theta=\theta_{soll}-\theta_{Ist})$ between a target temperature $(\theta_{soll})$ of the heat transfer medium that is to be achieved where the heat transfer medium temperature is measured and the current heat transfer medium temperature $(\theta_{Ist})$.

8. The method of claim 7, wherein an ambient temperature $(T_{amb})$ is additionally taken into account during the repeated recalculation of the temperature gradient threshold value $((dT/dt)_{schwell})$.

9. The method of claim 7, wherein the temperature gradient threshold value $((dT/dt)_{schwell})$ is repeatedly recalculated with the aid of the equation $$\left(\frac{dT}{dt}\right)_{Schwell} = c_1\left(\frac{\Delta v}{\Delta t}\right)^2 + c_2\frac{\Delta v}{\Delta t} + c_3$$

in which $c_1$, $c_2$ and $c_3$ are coefficients determined in advance.

10. The method of claim 7, wherein the temperature gradient threshold value $((dT/dt)_{schwell})$ is repeatedly recalculated with the aid of the equation $$\left(\frac{dT}{dt}\right)_{Schwell} = c_1\left(\frac{\Delta\vartheta}{\Delta t}\right)^2 + c_2\frac{\Delta\vartheta}{\Delta t} + c_3$$

in which $c_1$ and $c_2$ are coefficients determined as a function of the ambient temperature $(T_{amb})$ and $c_3$ is a coefficient determined in advance.

* * * * *